(12) United States Patent
Lai et al.

(10) Patent No.: US 6,687,119 B2
(45) Date of Patent: Feb. 3, 2004

(54) BUILT-UP MICROCOMPUTER

(75) Inventors: Chengshing Lai, Taipei (TW);
Wenyuan Huang, Nanjing (CN)

(73) Assignee: Inventec Electronics Co., Ltd., Nanjing (CN)

( * ) Notice: Subject to any disclaimer, the term of this patent is extended or adjusted under 35 U.S.C. 154(b) by 38 days.

(21) Appl. No.: 09/802,746

(22) Filed: Mar. 8, 2001

(65) Prior Publication Data
US 2001/0024356 A1 Sep. 27, 2001

(30) Foreign Application Priority Data

Mar. 16, 2000 (CN) ..................................... 00219631.X U

(51) Int. Cl.$^7$ ................................................. G06F 1/16
(52) U.S. Cl. ........................ 361/683; 361/679; 361/724
(58) Field of Search ................................ 361/679–686, 361/724–727

(56) References Cited

U.S. PATENT DOCUMENTS 5,751,547 A * 5/1998 Honda et al. ............... 361/686

* cited by examiner

Primary Examiner—Darren Schuberg
Assistant Examiner—Yean-Hsi Chang
(74) Attorney, Agent, or Firm—Oppenheimer Wolff & Donnelly LLP

(57) ABSTRACT

The Present invention discloses a built-up microcomputer, comprising an independent input interface integrated with computer main, and output interface integrated with computer main, an output interface as well as a connecting part. One end of the connecting part is hinged to the input interface and the other end is connected to independent input interface integrated with computer main. In the present invention, on the one hand, the independent input interface integrated with computer main can be connected with the input interface to constitute a set of microcomputer, on the other hand, it can also conveniently be separated from the output interface so as to be used independently. Hence, the design of present invention is capable to be combined or separated according to practical requirement, flexible and convenient both for operation and carrying.

4 Claims, 4 Drawing Sheets

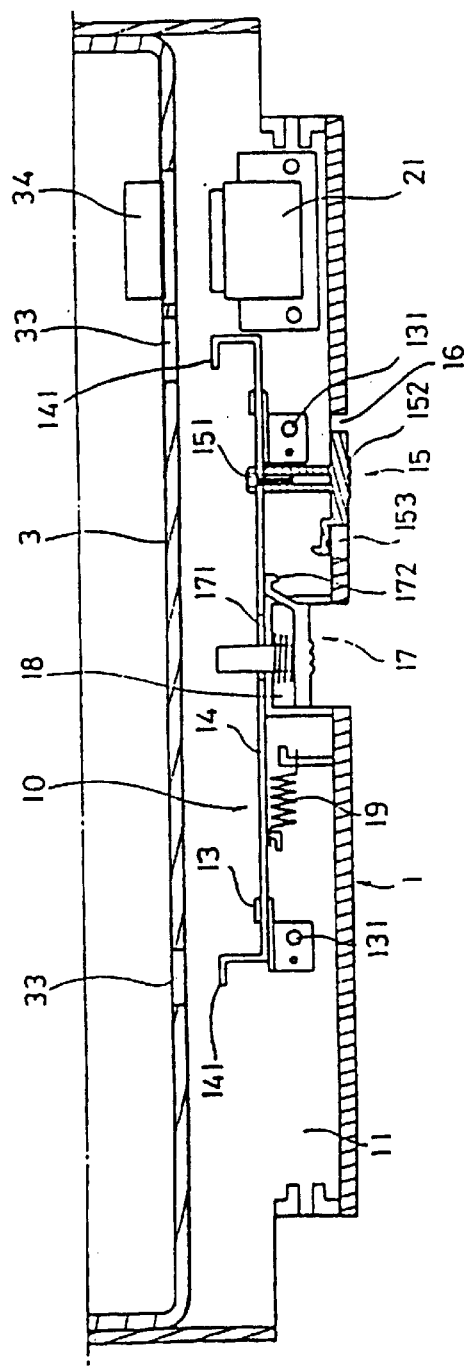
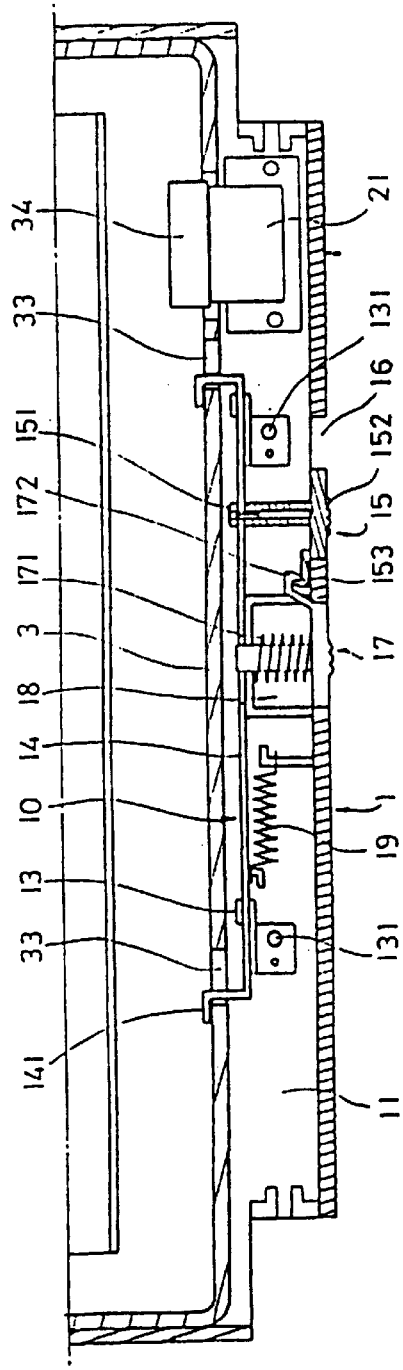
Fig. 3
Fig. 4

BUILT-UP MICROCOMPUTER

BACKGROUND OF THE INVENTION

1. Field of the Invention

The present invention is related to a microcomputer, particularly to improvement in assembling structure of a microcomputer, pertaining to the field of computer technology.

2. Description of the Related Art

Along with rapid development of science and technology as well as prevalence of Internet day by day, more and more computers are connected to Internet. Besides conventional personal computers, light-weight and small portable computer of notebook type microcomputer, E-Pad or PDA (personal digital assistant), a kind of microcomputer with connected output means, can be used for connection with internet during outgoing. The said microcomputer with connected output means is much smaller than microcomputer of notebook type, more convenient for carrying, and is capable to make input operation directly on touch screen. Operations such as e-mail, E-Commerce, E-Book, Internet-Web etc could be accomplished conveniently. But, due to the small overall dimensions of said computer, to the input means such as keyboard etc, the manufacturers usually apply fixed connection mode to form an integral set of microcomputer. Thus, the components of the computer cannot be folded, and can not to be disassembled too, so that it is inconvenient in usage for people.

In response to above structural problems of conventional microcomputer, the present invention is intended to provide a folding, detachable and built-up microcomputer, so as to offer more ideal functions.

SUMMARY OF THE INVENTION

To achieve above aims, the built-up microcomputer of the present invention comprises independent output means integrated with computer main, input means as well as a connecting part. One end of said connecting part is hinged to the input means, and the other end is connected to independent output means integrated with computer main.

Thus, the independent output means integrated with computer main can be connected with input means as keyboard etc to constitute a set of microcomputer; on the other hand, it also can be conveniently separated from the input means to be used independently. Hence, the design of the present invention is capable to be combined or separated according to practical requirement, flexible and convenient both for operation and carrying.

The present invention is further depicted as follows with reference to the accompanying drawings.

BRIEF DESCRIPTION OF THE DRAWINGS

FIG. 3 & FIG. 4 are schematic plan views of the structure of the snap fitting in the embodiment of FIG. 1.

DETAILED DESCRIPTION OF THE INVENTION

Figure 1:
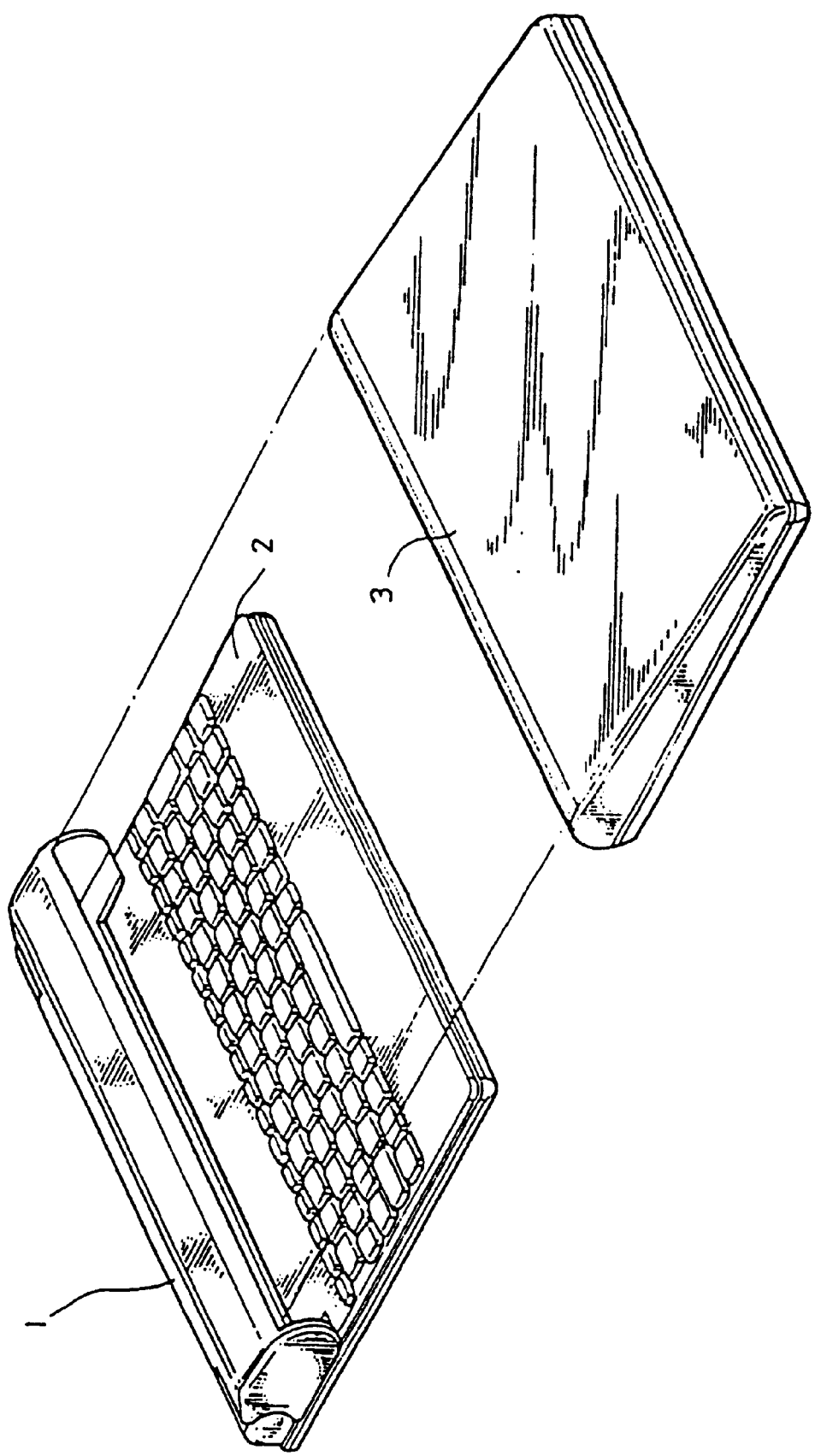
FIG. 1 is a schematic view of showing the structure of snap fitting of an embodiment of the present invention.

The built-up microcomputer in FIG. 1 comprises an input means 2 (keyboard in the present embodiment, but not limited to the keyboard in present invention), an output means 3 integrated with computer main (electronic notebook in present embodiment, but not limited to the electronic notebook in present invention) as well as a connecting part 1. One end of the connecting part 1 is hinged to the input means 2, and the other end is connected to the independent output means 3 integrated with computer main, such that said input means 2 can join with said independent output means 3 integrated with computer main through said connecting part 1. In case of necessity, the output means 3 integrated with computer main can be separated from the connecting part 1, and hence separated from the input means 2 so as to be used independently.

Figure 2:
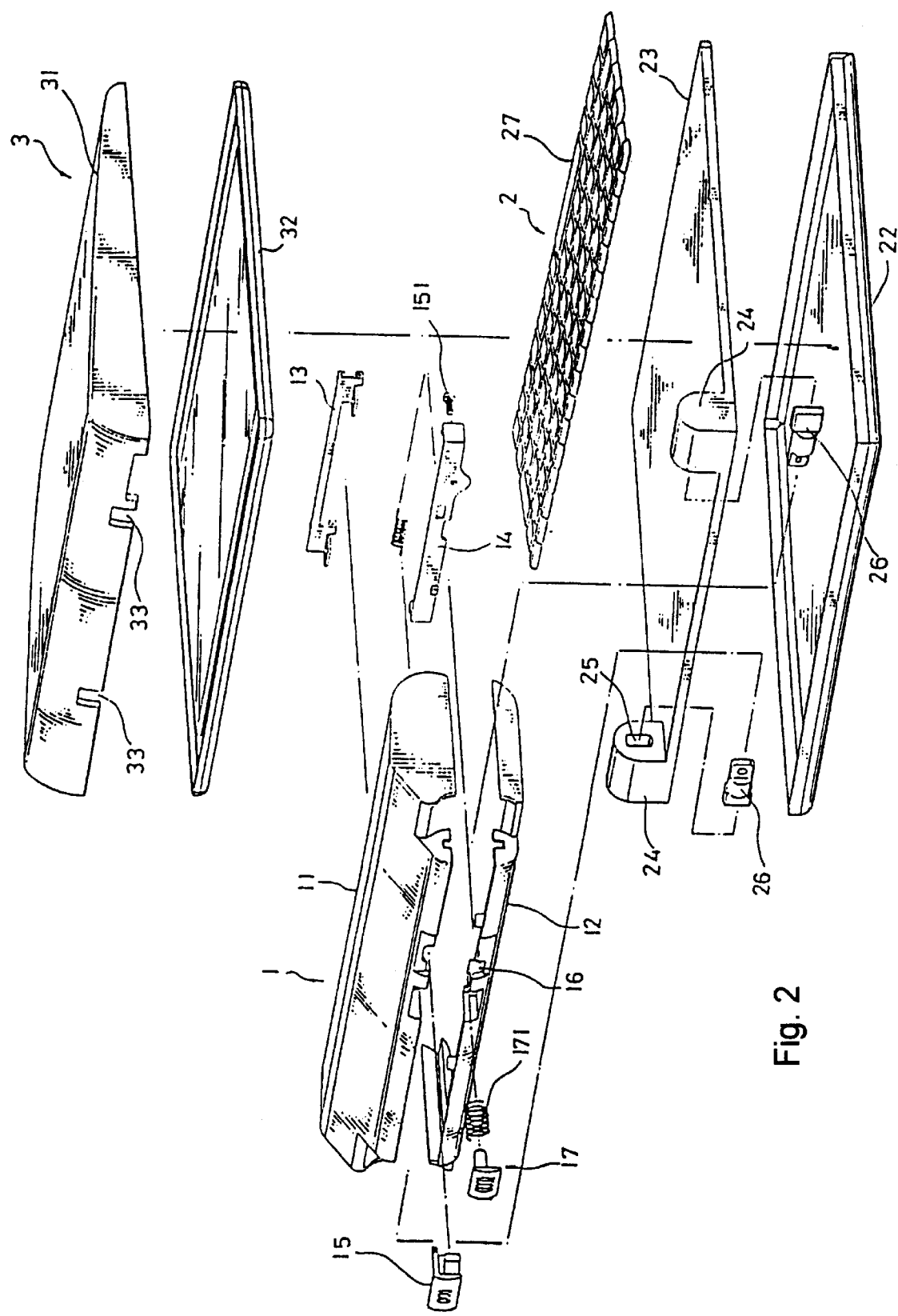
FIG. 2 is a schematic perspective exploded view of the structure of the embodiment in FIG. 1.

As shown in FIGS. 2 and 3, the output means 3 integrated with computer main of the present embodiment is composed of a main body 31 and a display screen 32 connected together. Said main body 31 has two openings 33 symmetrically arranged on the side corresponding to the connecting part 1. Said input means comprises a main body 22 and an outer housing 23 on top of said main body 22. Said outer housing 23 is provided with lugs 24 symmetrically disposed corresponding to one end of the connecting part 1. Each said lug 24 has a cavity 25 on an outer side. In the cavity 25 is fitted a rotary shaft 26, which is joined with the connecting part 1 so that the connecting part 1 can be turned over on the output means 2. Moreover, said output means 2 is connected to input terminals of electrical connector 21 on the connecting part 1 (not shown in figure). Said main body 31 has a connector 34 set up on an inner side adjacent to opening 33. Said connector 34 can be connected to the input terminals of electrical connector 21 on the connecting part 1, and the output means 3 integrated with computer main is electrically connected to the input means through said electrical connector 21.

Furthermore, as shown in FIGS. 2, 3, 4, the connecting part 1 is composed of an upper case 11 and a lower case 12 connected together. Within the upper case 11 and lower case 12 is set up a snap lock 10 with a base frame 13, which is connected to the lower case 12 through the joining member 131. A mobile latch 14 is set up on said base frame 13 and is capable to slide on the base frame 13 in both left and right directions. At both ends of said mobile latch 14 is provided a hook 141 respectively. When the output means 3 integrated with computer main is inserted in the connecting part 1, by the sliding of said mobile latch 14 on the base frame 13 to left or right, the mobile hook 141 can be hooked on to opening 33 of the output means 3 integrated with computer main, so that the independent output means 3 integrated with computer main is joined to connecting part 1. On the other hand, hook 141 can be disengaged from opening 33 of the output means 3 integrated with computer main, so that the independent output means 3 integrated with computer main can be separated from the connecting part 1 in case of necessity. On one side of mobile latch 14 is provided a push button 15, which is connected to mobile latch 14 through a fastener (a screw in present embodiment, but not limited to the screw in present invention). On the top end of said push button 15 is provided a rough portion 152, which protrudes out from the opening 16 of the connecting part 1 so that the button 15 can be moved from outside of the connecting part 1, and thereby the mobile latch 14 can be slid on the base frame 13 to left or right. The mobile latch 14, on the side adjacent to said button 15 is provided a disengaging key 17, which moves up and down in the opening 18 set on the connecting part 1 and is surrounded by a restoring elastic element 171 (an helical spring in present embodiment, but not limited to the spring in present invention). Said elastic element 171 makes the disengaging key 17 restore to original position after being pressed down. Said disengaging key 17 has an out extending first hook 172 set at the side corresponding to the push button 15, and the push button 15 has a second hook 153 mating with first hook 172. When the first hook 172 and second hook 153 are hooked to each other, the push button 15 can not be pressed down. But as soon as disengaging key 17 is pressed down, the second hook 153 is disengaged from the first hook 172 and the push button 15 can again be pressed down. In addition, the mobile latch 14 has a restoring elastic element 19 set at the other side corresponding to push button 15. Said restoring elastic element 19 is connected with the connecting part 1 at the other side corresponding to the mobile latch 14, so that mobile latch 14 can be restored to its original position by the sliding of mobile latch 14 to left and right through the pushing of button 15.

After understanding above constructional relation of structural members, it can be seen from FIG. 1 that when the independent output means 3 integrated with computer main is connected to the connecting part 1, the output means 3 integrated with computer main can be connected through snap lock 10, so that the output means 3 integrated with computer main is joined together with the input means. Then the input means 2 becomes the input keyboard of output means 3 integrated with computer main, forming a set of microcomputer. If necessary, the independent output means 2 integrated with computer main can be separated from snap lock 10, thereby the output means 3 integrated with computer main is also separated from the input means 2. In this way, the independent output means 3 integrated with computer main, being separated from said input means 2, can be used independently.

Figure 5:
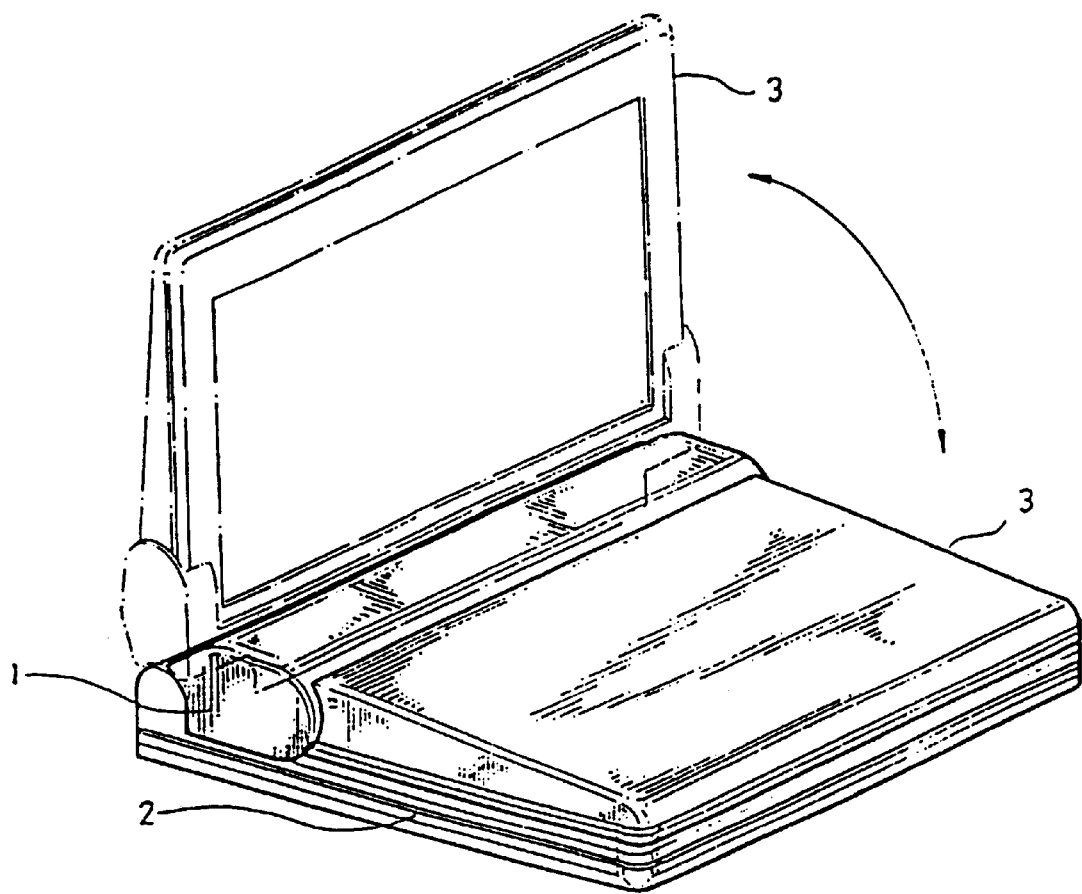
FIG. 5 is a schematic view of the embodiment of FIG. 1 in state of usage.

Finally, with reference to FIG. 5, when the output means 3 integrated with computer main is connected with the input means 2 through the connecting part 1, a set of microcomputer is formed. Due to the fact that the connecting part 1 is hinged to input means 2, the independent output means 3 integrated with computer main is capable to be turned over on the input means through the connecting part 1. Obviously, the design of present embodiment is ingenious, flexible and convenient in operation.

Besides above said preferred embodiment, other embodiments are also available for present invention. All equivalent substitutions or modifications will fall within the scope of patent protection of present invention.

What is claimed is:

1. A built-up microcomputer, comprising an output means (3) integrated with computer main, an input means (2) as well as connecting part (1), wherein one end of said connecting part (1) is hinged to the input means (2), and the other end is joined to the independent output means (3) integrated with computer main, wherein said connecting part (1) is composed of an upper case (11) and a lower case (12) which are connected together, within the upper case (11) and lower case (12) is set up a snap lock (10), wherein said snap lock (10) is provided with a base frame (13), which is connected to the lower case (12) through a joining member (131), a mobile latch (14) is set up on said base frame (13) and is capable to slide on base frame (13) to left or right, at both ends of said mobile latch (14) is provided a hook (141) respectively, when output means (3) integrated with computer main is inserted in the connecting part (1), by the sliding of said mobile latch (14) on the base frame (13) to left or right, the hook (141) can be hooked on to opening (33) of the output means (3) integrated with computer main, so that independent output means (3) integrated with computer main is joined to the connecting part (1), on the other hand, hook (141) can be disengaged from opening (33) of the output means (3) integrated with computer main, so that the independent output means (3) integrated with computer main can be separated from connecting part (1).

2. A built-up microcomputer as defined in claim 1, wherein on one side of said mobile latch (14) is provided a push button (15), which is connected to the mobile latch (14) through a fastener, on the top end of said push button (15) is provided a rough portion (152), which protrudes out from the opening (16) of the connecting part (1) SO that the push button (15) can be moved from outside of the connecting part (1), and the mobile latch (14) can be slid on the base frame (13) to left or right.

3. A built-up microcomputer as defined in claim 2, wherein adjacent to said button (15), said mobile latch (14) is provided with a disengaging key (17), which moves up and down in the opening (18) set on the connecting part (1) and is surrounded by a restoring elastic element (171), said elastic element (171) makes the disengaging key restore to original position after being pressed down, said disengaging key (17) has an out extending first hook (172) set at the side corresponding to push button (15), and the push button (15) has a second hook (153) mating with first hook (172), when first hook (172) and second hook (153) are hooked to each other, the push button (15) can not be pushed down, but as soon as the disengaging key (17) is pressed down, the second hook (153) is disengaged from the first hook (172) and the push button (15) can again be pressed down.

4. A built-up microcomputer, comprising an output means (3) integrated with computer main, an input means (2) as well as connecting part (1), wherein one end of said connecting part (1) is hinged to the input means (2), and the other end is joined to the independent output means (3) integrated with computer main, wherein a mobile latch (14) has a restoring elastic element (19) set at the other side corresponding to the push button (15), said restoring elastic element (19) is connected with the connecting part (1) at the other side corresponding to mobile latch (14), so that the mobile latch (14) can be restored to its original position by the sliding of mobile latch (14) to left and right through the pushing of the push button (15).

* * * * *